(12) United States Patent
Dinh

(10) Patent No.: US 6,180,882 B1
(45) Date of Patent: Jan. 30, 2001

(54) SINGLE AND DUAL CABLE SEAL SYSTEM

(75) Inventor: Cong Thanh Dinh, Memphis, TN (US)

(73) Assignee: Thomas & Betts, International, Sparks, NV (US)

( * ) Notice: Under 35 U.S.C. 154(b), the term of this patent shall be extended for 0 days.

(21) Appl. No.: 09/233,237

(22) Filed: Jan. 19, 1999

(51) Int. Cl.$^7$ .................................................. H02G 3/18
(52) U.S. Cl. ....................... 174/65 SS; 16/2.2; 248/56; 439/462
(58) Field of Search .................... 174/65 R, 65 SS, 174/59, 65 G, 151, 152 G, 153 G, 135, 64, 60, DIG. 8; 285/918; 138/DIG. 8; 16/2.1, 2.2; 248/56; 439/544, 559, 548, 462, 587, 274, 275, 279

(56) References Cited

U.S. PATENT DOCUMENTS

| | | |
|---|---|---|
| 625,448 | 5/1899 | Jaenichen . |
| 1,201,022 | 10/1916 | Conniff . |
| 3,224,796 | 12/1965 | Burkitt ................................. 285/161 |
| 4,236,736 | 12/1980 | Anderson .............................. 285/150 |
| 4,343,496 | 8/1982 | Petranto ................................. 285/39 |
| 4,379,204 | 4/1983 | Perrault et al. ...................... 174/277 |
| 4,739,596 * | 4/1988 | Cunningham et al. ............ 248/56 X |
| 4,889,370 | 12/1989 | Firestone ............................... 285/342 |
| 4,940,249 | 7/1990 | Drbal .................................... 279/174 |
| 4,982,055 * | 1/1991 | Pollack et al. ................... 439/559 X |
| 5,152,556 | 10/1992 | Holland et al. ...................... 285/353 |
| 5,226,678 | 7/1993 | Petranto ................................. 285/39 |
| 5,257,763 * | 11/1993 | Nakamura ............................... 248/56 |
| 5,406,032 | 4/1995 | Clayton et al. ....................... 174/151 |
| 5,421,541 * | 6/1995 | Condon ................................... 248/56 |
| 5,545,854 | 8/1996 | Ishida ................................... 174/153 |
| 5,547,229 | 8/1996 | Eidsmore ............................... 285/93 |
| 5,594,202 * | 1/1997 | Tobias ................................ 248/56 X |
| 5,608,189 | 3/1997 | Winterhoff et al. ................. 174/285 |
| 5,648,639 * | 7/1997 | Hand ..................................... 174/51 |
| 5,704,806 * | 1/1998 | Post et al. ............................ 439/546 |
| 5,736,677 | 4/1998 | Sato et al. .............................. 174/65 |
| 6,034,325 * | 3/2000 | Nattel et al. ........................... 171/59 |

FOREIGN PATENT DOCUMENTS

| 2274208 * | 7/1994 | (GB) ..................................... 174/65 |

* cited by examiner

*Primary Examiner*—Kristine Kincaid
*Assistant Examiner*—Dhiru R Patel
(74) *Attorney, Agent, or Firm*—G. Andrew Barger

(57) ABSTRACT

A sealing system for sealing environmental elements from passing between at least one cable and a wall, including a hug secured to the wall and having threads. A ring is disposed about the cable and has at least one slit disposed therein for sliding the cable therein to dispose the ring about the cable. A pressure nut compresses the cable therein and has threads for screwingly engaging the threads of the hug, a first half, and a second half releasably coupled to the first half for inserting the cable therein to dispose the first half and the second half about the cable. Further, a mechanism for sealing is disposed about the cable between the ring and the pressure nut. The ring, the mechanism for sealing, and the pressure nut are installed about the cable without interruption of cable transmission service.

20 Claims, 5 Drawing Sheets

SINGLE AND DUAL CABLE SEAL SYSTEM

FIELD OF THE INVENTION

In general, the present invention relates to sealant systems, and, in particular, the present invention relates to a sealing system for a single or dual cable, which may be installed when the single or dual cable is attached at both ends thereby preventing interruption of transmission service carried by the cable.

BACKGROUND

For many years sealing the area around cables entering walls, and especially the walls of cable trays wherein fiberoptic cables are spliced, from environmental elements has been difficult for various industries. Currently, the industry uses a heat shrink tube that surrounds a hug, which allows entrance of one or more cables into the wall of a cable tray. The cable is installed in the tray, and secured thereto, then the tray is placed in the ground. A heat gun is subsequently used to shrink the tube around the hug. This causes a potentially dangerous situation do to the presence of gas or water that may be underground. Further, the cable must be fully installed when the heat shrink tube is applied preventing replacement of the tube, if it should break or crack, without interruption of cable transmission service because the cable must be removed from the interior of the tray and a new tube placed over the hug.

U.S. Pat. No. 4,379,204 to Perrault et al. discloses a strip 41 having a steel wire running therethrough, which is "sandwiched" between a flat washer 29 and an adapter 33 for sealing a cable. This patent does not teach nor show a split ring or two piece pressure nut design allowing the sealing system to be installed on the cable without interruption of cable service. The patent also does not teach nor show the sealing of two cables simultaneously of the installation of a sealing system about the two cables without interruption of cable service. Moreover, the sealant strip is relatively costly and a bushing is not shown substituted for the sealant strip, among other things.

SUMMARY OF THE INVENTION

The present invention eliminates the above difficulties and disadvantages by providing a sealing system for sealing environmental elements from passing between at least one cable and a wall. The system includes a hug secured to the wall, having threads. A first ring is disposed about the cable and has at least one slit disposed therein for sliding the cable therein to dispose the ring about the cable. A pressure nut compresses the cable therein and has threads for screwingly engaging the threads of the hug, a first half, and a second half releasably coupled to the first half for inserting the cable therein to dispose the first half and the second half about the cable. Further, a mechanism for sealing is disposed about the cable between the first ring and the pressure nut and the first ring, the mechanism for sealing, and the pressure nut are installed about the cable without interruption of cable transmission service.

A second ring is disposed about the at least one cable and having at least one slit disposed therein for sliding the at least one cable therein to dispose the second ring about the at least one cable. Moreover, the hug further includes an external abutment end and an internal abutment end spaced from the external abutment end.

A further advantage is that the first half of the pressure nut includes at least one first extension projecting therefrom, a first lip abutting the external abutment end, and at least one first receiving aperture. The second half of the pressure nut includes at least one second extension projecting therefrom and being inserted into the at least one first receiving aperture and a second lip abutting the external abutment end. The second half of the pressure nut includes at least one second receiving aperture in which the first extension is inserted. In addition, the first ring abuts the internal abutment end of the hug and the mechanism for sealing comprises a sealant tape.

Yet another advantage is that the mechanism for sealing can also comprise a bushing that includes a slit disposed therein for sliding the at least one cable therein to dispose the bushing about the at least one cable.

DETAILED DESCRIPTION OF THE PREFERRED EMBODIMENT(S)

Figure 1:
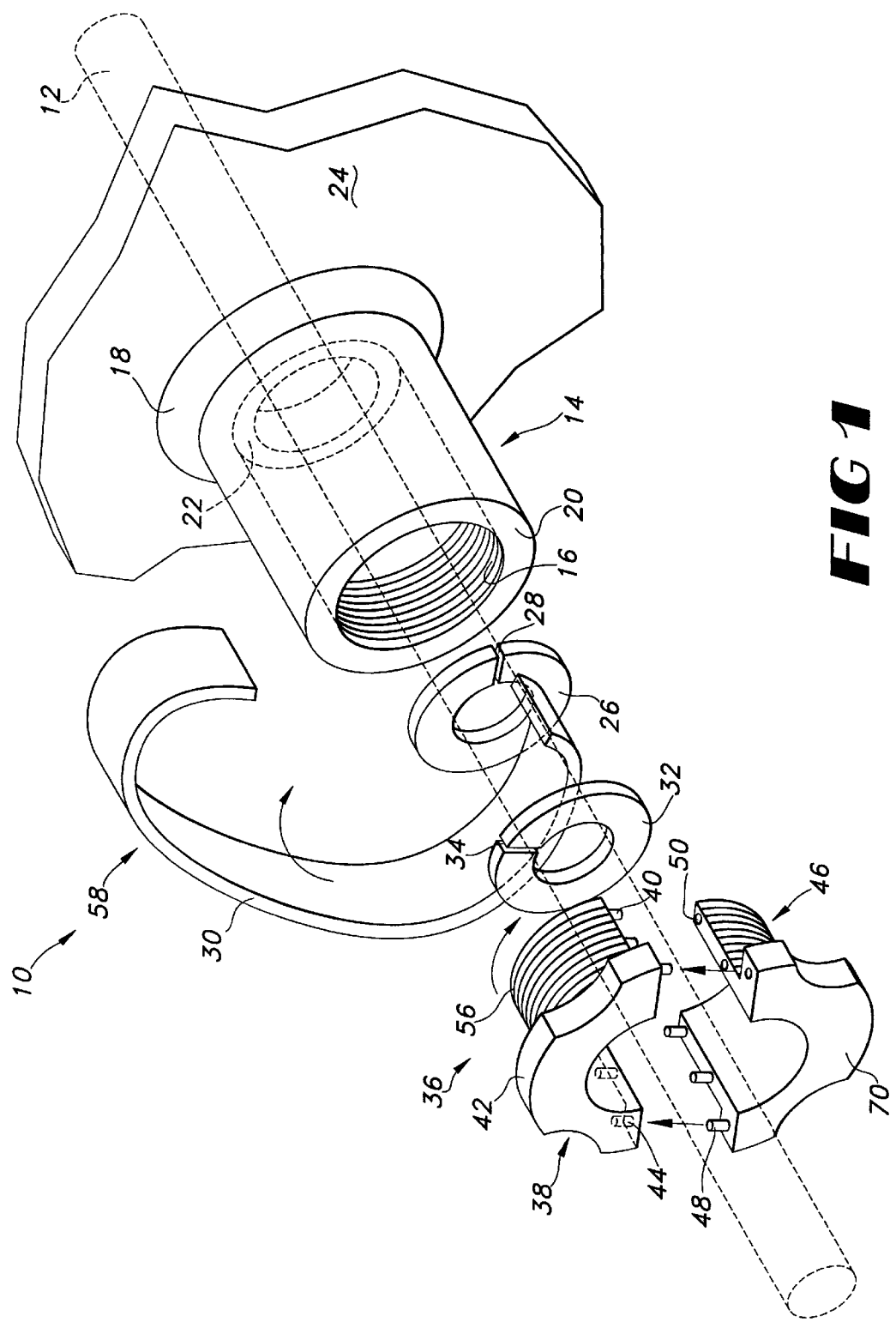
FIG. 1 is an exploded view of a single cable seal system of the present invention having a sealant tape encompassing the cable.

The above and other features, aspects, and advantages of the present invention will now be discussed in the following detailed description and appended claims, which are to be considered in conjunction with the accompanying drawings in which identical reference characters designate like elements throughout the views. Shown in FIG. 1 is a sealing system 10 for sealing environmental elements from passing between at least one cable 12 and a wall 24 of a box that is often buried in the ground or secured to a telephone pole, which makes the box waterproof and allows 5–10 lbs. psi to be contained within the box without air leakage. The cable 12 provides cable transmission service, such as video, audio, computer, and various telephone and data communications signals. Because this service is vital to operations of corporations, the present sealing system 10 can be easily installed without interruption of the cable transmission service.

Figure 2:
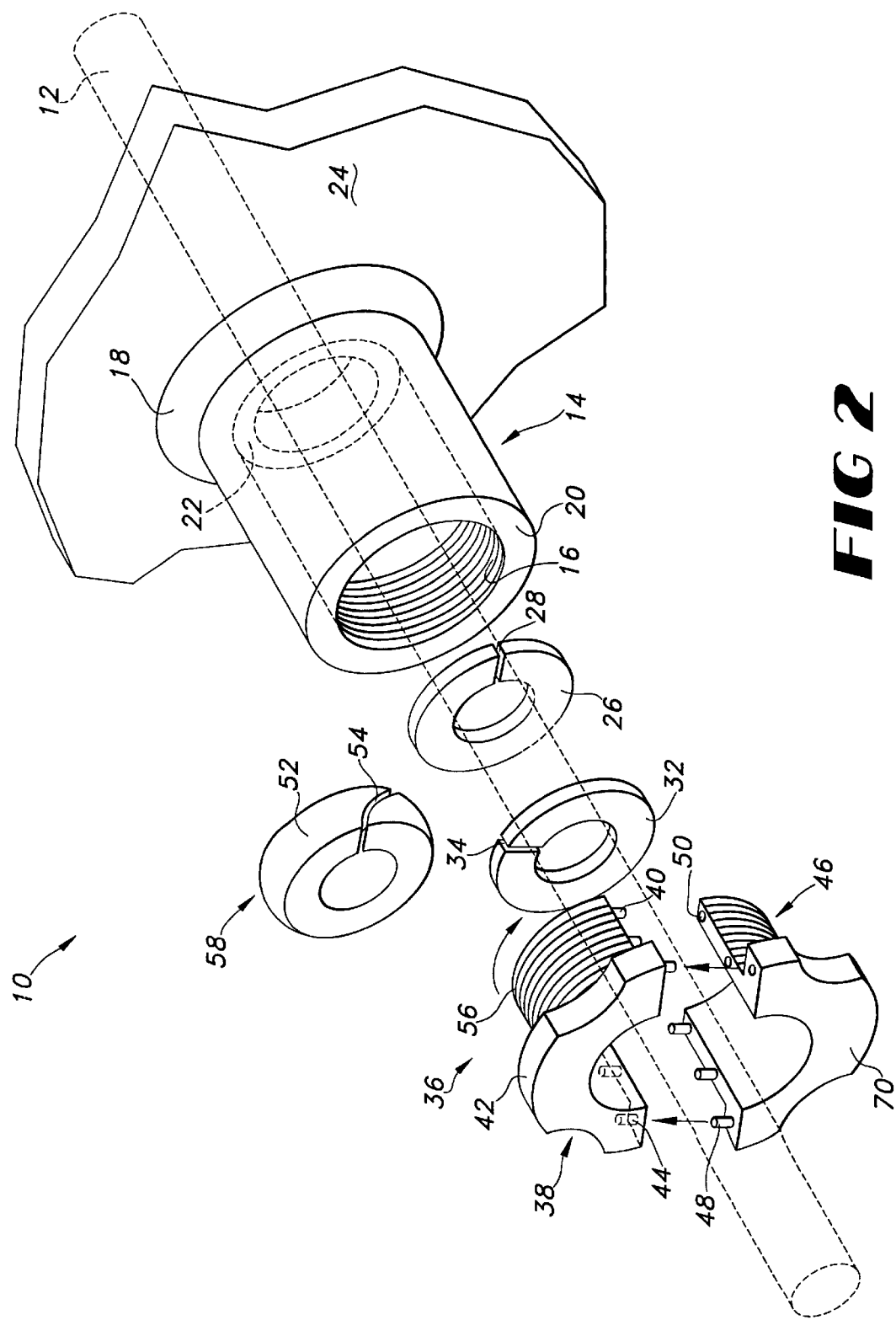
FIG. 2 is an exploded view of a single cable seal system of the present invention having a bushing encompassing the cable.
Figure 5:
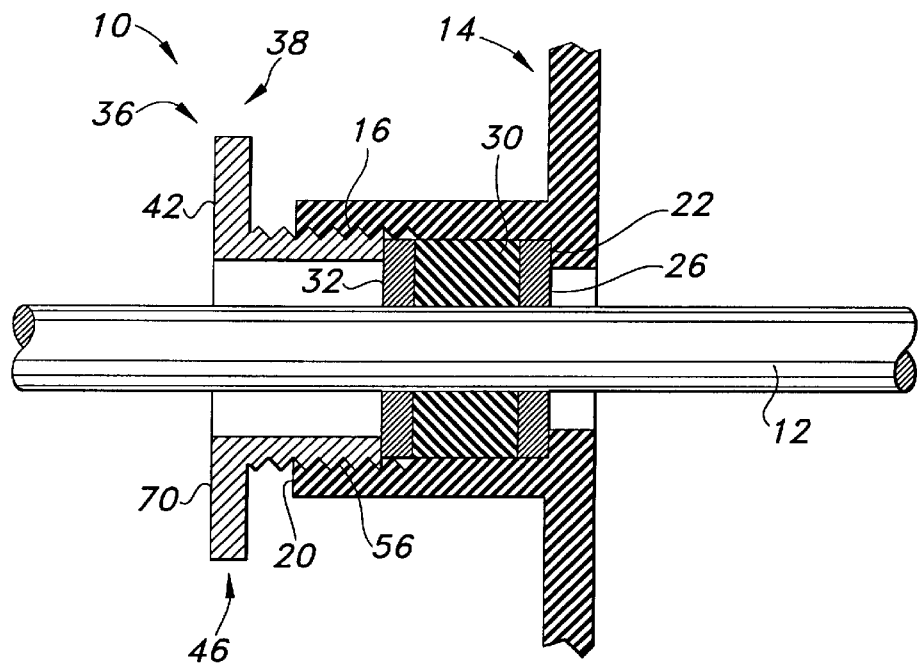
FIG. 5 is a cross-sectional view of the single cable seal system of the present invention having a bushing or sealant tape encompassing the cable.

The present sealing system 10 includes a hug 14, preferably constructed of plastic or other non-corrosive material such as stainless steel, secured to the wall 24 and having internal threads 16. The system 10 also includes an external abutment end 20, and an internal abutment end 22 spaced from the external abutment end 20. A sealant collar 18 encompasses the hug 14 at the wall 24. As shown in FIGS. 1, 2, and 5, a first ring 26 is disposed about the cable 12 and has at least one first slit 28 disposed therein for sliding the cable 12 therein to dispose the first ring 26 about the cable. The first ring 26 is preferably constructed of nylon but can be of any relatively hard, thermoplastic. Further, a second ring 32, which is preferably of the same material as the first ring 26, is disposed about the cable 12 and has at least one second slit 34 disposed therein for sliding the at least one cable 12 therein to dispose the second ring 32 about the at least one cable 12. Similar to the first ring 26, the second ring 32 is preferably constructed of nylon but can be of any relatively hard, thermoplastic.

As shown in FIGS. 1–4, means for sealing 58 are provided in the present system 10 and are disposed about the at least one cable 12 between the first ring 26 and second ring 32 within the hug 14. Preferably the means for sealing 58 is a sealant tape 30 made of BUTYL-type rubber and manufactured by the Thomas & Betts Corporation, but could also be duct tape, electrical tape, or other tape that is adhesive on one or both sides. Also preferably the means for sealing 58 is a rubber bushing 52. The rubber bushing 52 has a slit 54 for sliding the cable within the bushing 52 when a single cable 12 is used as shown in FIG. 2.

As shown in FIGS. 1–6, a two piece pressure nut 36, which is preferably constructed of nylon or other thermoplastic, but could also be constructed from other non-corrosive material such as stainless steel or aluminum, is provided for compressing the at least one cable 12 therein and that has external threads 56 for screwingly engaging the internal threads 16 of the hug 14. It is understood, however, that the pressure nut 36 can be of a one-piece construction. The pressure nut 36 has a first half 38 that includes at least one first extension 40 projecting therefrom, a first lip 42 for abutting the external abutment end 20 of the hug 14, and at least one first receiving aperture 44. The pressure nut 36 further includes a second half 46 that has at least one second extension 48 projecting therefrom and that is inserted into the at least one first receiving aperture 44 when the at least one cable is compressed therein. A second lip 70 abuts the external abutment end 20 of the hug 14, and at least one second receiving 50 aperture in which the first extension 40 is inserted when the at least one cable is compressed therein.

Therefore, as described above, the first ring 26 and second ring 32, the means for sealing 58, and the two piece pressure nut 36 are installed about the at least one cable 12 without interruption of cable transmission service such that the box can remain in the ground or secured to the telephone pole. When the system 10 is installed, as shown in FIG. 5, the first ring 26 abuts the internal abutment end 22 and the second ring 32 is compressed toward the first ring 26 by the pressure nut 36 as it screwingly engages the hug 14 such that the sealant tape 30 or rubber bushing 52 expands outward to seal off environmental elements from passing between the cable 12 and the wall 24.

Figure 3:
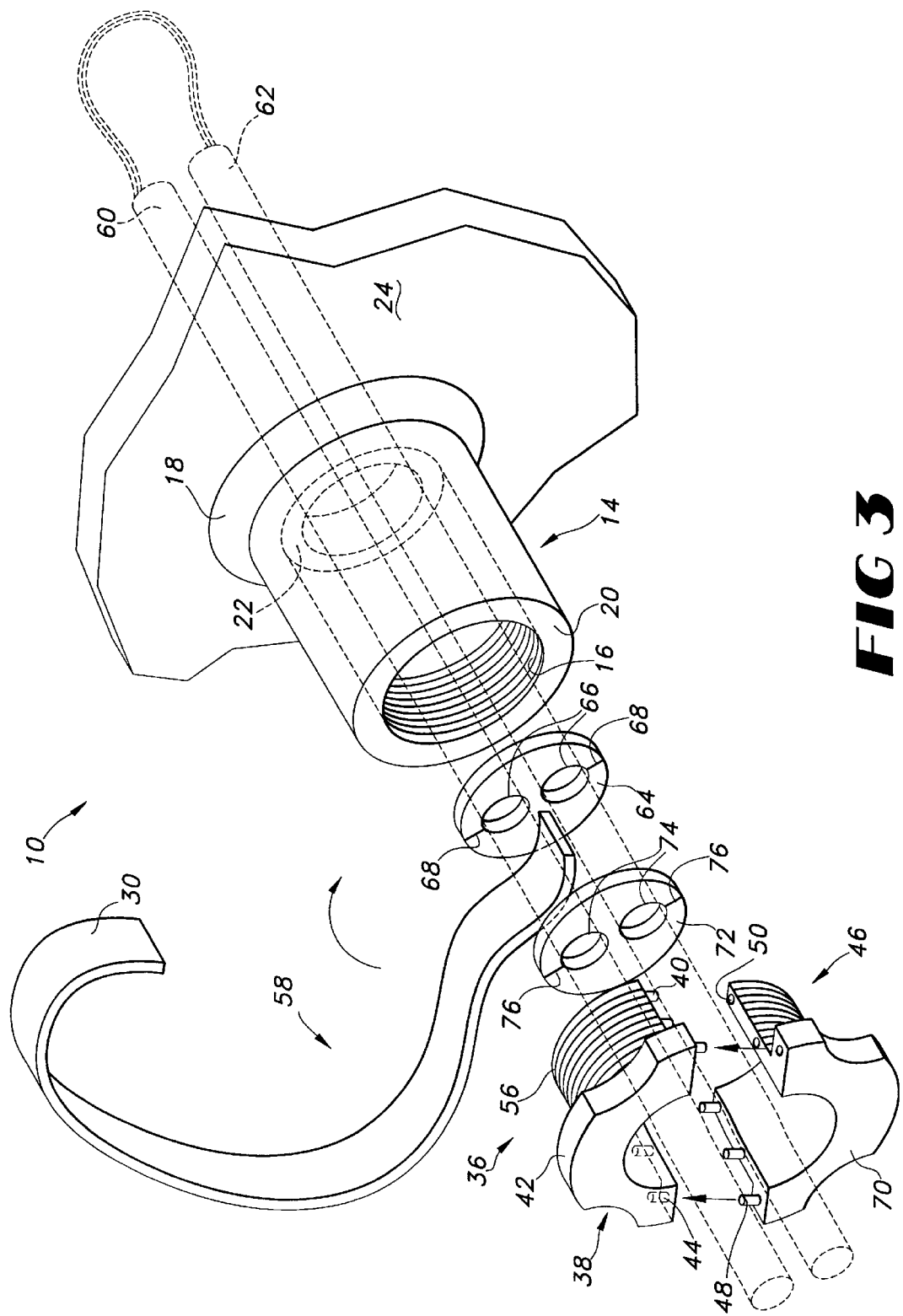
FIG. 3 is an exploded view of a double cable seal system of the present invention having a sealant tape encompassing the cables.
Figure 4:
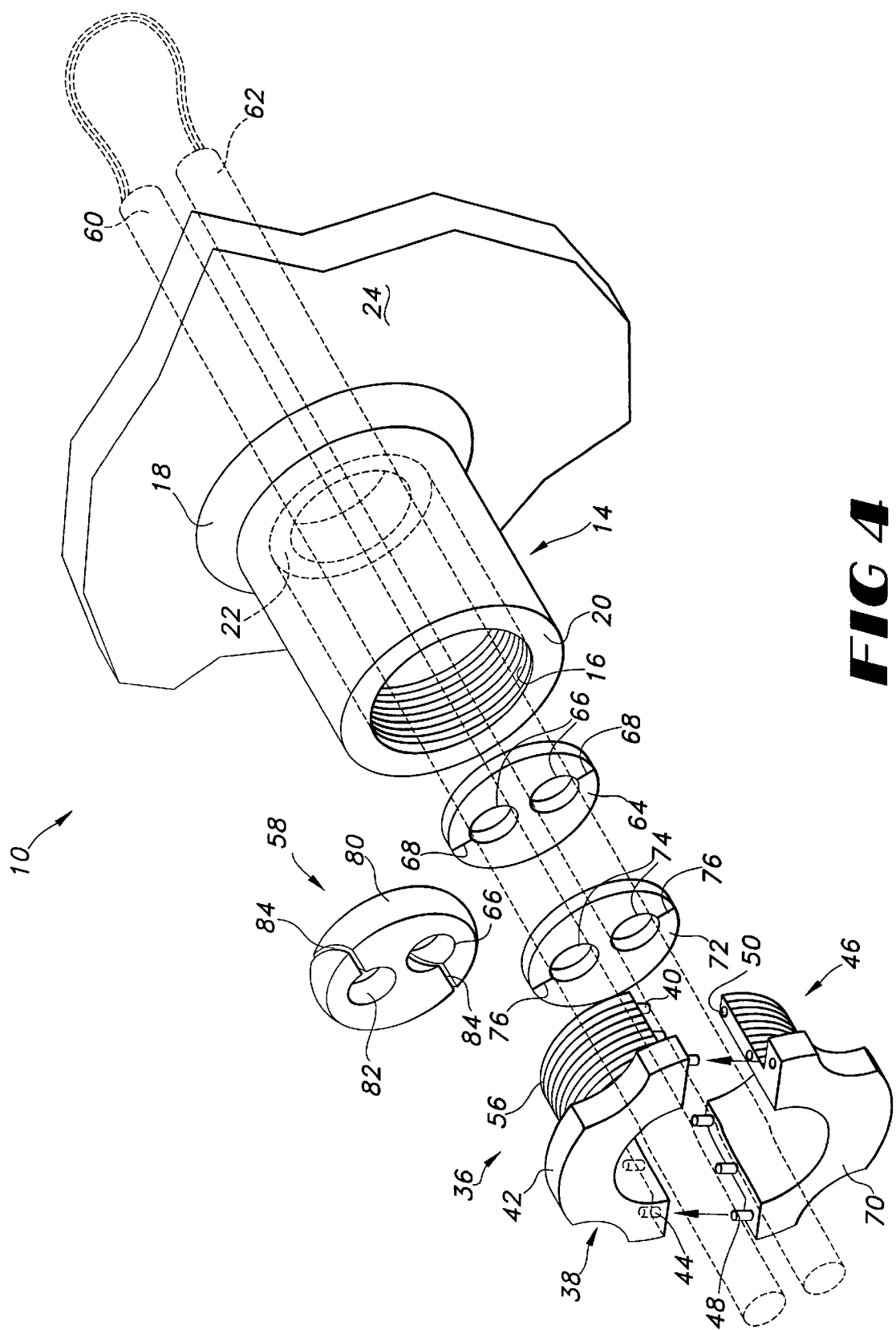
FIG. 4 is an exploded view of a double cable seal system of the present invention having a bushing encompassing the cables.
Figure 6:
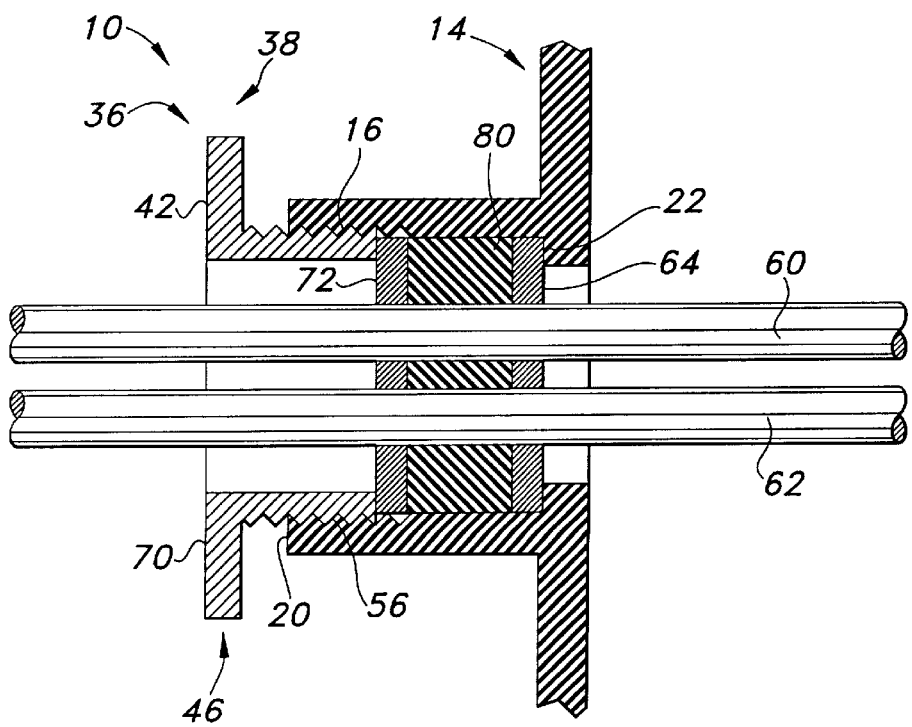
FIG. 6 is a cross-sectional view of the double cable seal system of the present invention having a bushing or sealant tape encompassing the cables.

The present sealing system 10 is further applicable to sealing dual cables 60, 62, which may be spliced or looped behind the wall 24, as is best shown in FIGS. 3, 4, and 6. The system 10 includes a hug 14 secured to the wall 24 having internal threads 16, an external abutment end 20, and an internal abutment end 22 spaced from the external abutment end 20. A first dual split ring 64 is disposed about the dual cables 60, 62 via a first set of cable apertures 66 and has a first set of slits 68 disposed therein for sliding the dual cables 60, 62 therein to dispose the first dual split ring 64 about the cables. The first dual split ring 64 is preferably constructed of nylon but can be of any relatively hard, thermoplastic. When the system 10 is installed, as shown in FIG. 6, the first dual split ring 64 abuts the internal abutment end 22 of the hug 14. Further, a second dual split ring 72 is disposed about the dual cables 60, 62 via a second set of cable apertures 74 and has a second set of slits 76 disposed therein for sliding the dual cables 60, 62 therein to dispose the second dual split ring 72 about the cables. Similar to the first dual split ring 64, the second dual split ring 72 is preferably constructed of nylon but can be of any relatively hard, thermoplastic.

Means for sealing 58 are provided in the present system 10 and are disposed about the dual cables 60, 62 between the first dual split ring 64 and second dual split ring 72 within the hug 14. Preferably the means for sealing 58 is a sealant tape 30 made of BUTYL-type rubber and manufactured by the Thomas & Betts Corporation having a principal place of business at 8155 T&B Boulevard, Memphis, Tenn. 38125 and a URL of www.tnb.com, but could also be duct tape, electrical tape, or other tape that is adhesive on one or both sides. Also preferably the means for sealing 58 is a dual split rubber bushing 52. The dual split bushing 80 has dual slits 84 for sliding the dual cables 60, 62 within the dual split bushing 80 when dual cables 60, 62 are used as shown in FIG. 4. The cables 60,62 are inserted into a dual set of cable apertures 82.

As shown in FIGS. 1–6, and mentioned above, a two piece pressure nut 36 is provided for compressing the at least one 12 cable therein and that has external threads 56 for screwingly engaging the internal threads 16 of the hug 14. The pressure nut 36 has a first half 38 that includes at least one first extension 40 projecting therefrom, a first lip 42 for abutting the external abutment end 20 of the hug 14, and at least one first receiving aperture 44. The pressure nut 36 further includes a second half 46 that has at least one second extension 48 projecting therefrom and that is inserted into the at least one first receiving aperture 42 when the dual cables 60, 62 are compressed therein. A second lip 70 abuts the external abutment end 20 of the hug 14, and at least one second receiving 50 aperture in which the first extension 40 is inserted when the dual cables 60, 62 are compressed therein.

Therefore, as described above, the first dual split ring 64 and second dual split ring 72, the means for sealing 58, and the two piece pressure nut 36 are installed about the dual cables 60, 62 without interruption of cable transmission service such that the box can remain in the ground or secured to the telephone pole. When the system 10 is installed, as shown in FIG. 6, the first dual split ring 64 abuts the internal abutment end 22 of the hug 14 and the second dual split ring 72 is compressed toward the first dual split ring 64 by the pressure nut 36 as it screwingly engages the hug 14 such that the sealant tape 30 or dual split bushing 80 expands outward to seal off environmental elements from passing between the dual cables 60, 62, and also the dual cables 60, 62 and the wall 24.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

What is claimed is:

1. A sealing system for sealing environmental elements from passing between at least one cable and a wall, the at least one cable provides cable transmission service, and a threaded hug secured to the wall the sealing system comprising:

a first ring disposed about the at least one cable and having at least one slit disposed therein for sliding the at least one cable therein to dispose the first ring about the at least one cable;

a pressure nut for compressing the at least one cable therein and having threads for screwingly engaging the threads of the hug, a first half, and a second half releasably coupled to the first half for inserting the at least one cable therein to dispose the first half and the second half about the at least one cable;

means for sealing disposed about the at least one cable between the first ring and the pressure nut; and wherein the first ring, the means for sealing, and the pressure nut are installed about the at least one cable without interruption of cable transmission service.

2. The sealing system of claim 1 further comprising a second ring disposed about the at least one cable and having at least one slit disposed therein for sliding the at least one cable therein to dispose the second ring about the at least one cable.

3. The sealing system of claim 1 wherein the hug further includes an external abutment end.

4. The sealing system of claim 3 wherein the hug further includes an internal abutment end spaced from the external abutment end.

5. The sealing system of claim 4 wherein the first ring abuts the internal abutment end.

6. The sealing system of claim 3 wherein the first half of the nut includes at least one first extension projecting therefrom, a first lip abutting the external abutment end, and at least one first receiving aperture.

7. The sealing system of claim 6 wherein the second half of the nut includes at least one second extension projecting therefrom and being inserted into the at least one first receiving aperture.

8. The sealing system of claim 6 wherein the second half of the nut includes a second lip abutting the external abutment end.

9. The sealing system of claim 6 wherein the second half of the pressure nut includes at least one second receiving aperture in which the at least one first extension is inserted.

10. The sealing system of claim 1 wherein the means for sealing comprises a sealant tape.

11. The sealing system of claim 1 wherein the means for sealing comprises a bushing.

12. The sealing system of claim 11 wherein the bushing includes a slit disposed therein for sliding the at least one cable therein to dispose the bushing about the at least one cable.

13. A sealing system for sealing environmental elements from passing between at least two cables and a wall, the at least two cables providing cable transmission service, and an internally threaded hug secured to the wall having an external abutment end, and an internal abutment end spaced from the external abutment end the sealing system comprising:

a first ring disposed about the at least two cables and having at least one slit disposed therein for sliding the at least two cables therein to dispose the first ring about the at least two cables, the first ring abutting the internal abutment end;

a second ring disposed about the at least two cables and having at least one slit disposed therein for sliding the at least two cables therein to dispose the second ring about the at least two cables;

means for sealing disposed about the at least two cables between the first and second rings within the hug;

a two piece pressure nut having external threads for screwingly engaging the internal threads of the hug and for compressing the at least two cables therein, the pressure nut comprising:

a first half including at least one first extension projecting therefrom, a first lip abutting the external abutment end, and at least one first receiving aperture;

a second half including at least one second extension projecting therefrom and being inserted into the at least one first receiving aperture, a second lip abutting the external abutment end, and at least one second receiving aperture in which the at least one first extension is inserted; and wherein the first and second rings, the means for sealing, and the two piece pressure nut are installed about the at least two cables without interruption of said cable transmission service.

14. The sealing system of claim 13 wherein the means for sealing comprises a sealant tape.

15. The sealing system of claim 13 wherein the means for sealing comprises a bushing.

16. The sealing system of claim 15 wherein the bushing includes a slit disposed therein for sliding the at least two cable therein to dispose the bushing about the at least two cable.

17. A sealing system for sealing environmental elements from passing between at least one cable and a wall, the at least one cable provides cable transmission service, and an internally threaded hug secured to the wall having an external abutment end, and an internal abutment end spaced from the external abutment end, the sealing system comprising:

a first ring disposed about the at least one cable and having at least one slit disposed therein for sliding the at least one cable therein to dispose the first ring about the at least one cable, the first ring abutting the internal abutment end;

a second ring disposed about the at least one cable and having at least one slit disposed therein for sliding the at least one cable therein to dispose the second ring about the at least one cable;

means for sealing disposed about the at least one cable between the first and second rings within the hug;

a two piece pressure nut for compressing the at least two cables therein and having external threads for screwingly engaging the internal threads of the hug, comprising:

a first half including at least one first extension projecting therefrom, a first lip abutting the external abutment end, and at least one first receiving aperture;

a second half including at least one second extension projecting therefrom and being inserted into the at least one first receiving aperture, a second lip abutting the external abutment end, and at least one second receiving aperture in which the said at least one first extension is inserted; and wherein the first and second rings, the means for sealing, and the two piece pressure nut are installed about the at least one cable without interruption of the cable transmission service.

18. The sealing system of claim 17 wherein the means for sealing comprises a sealant tape.

19. The sealing system of claim 17 wherein the means for sealing comprises a bushing.

20. The sealing system of claim 19 wherein the bushing includes a slit disposed therein for sliding the at least one cable therein to dispose the bushing about the at least one cable.

* * * * *